UNITED STATES PATENT OFFICE.

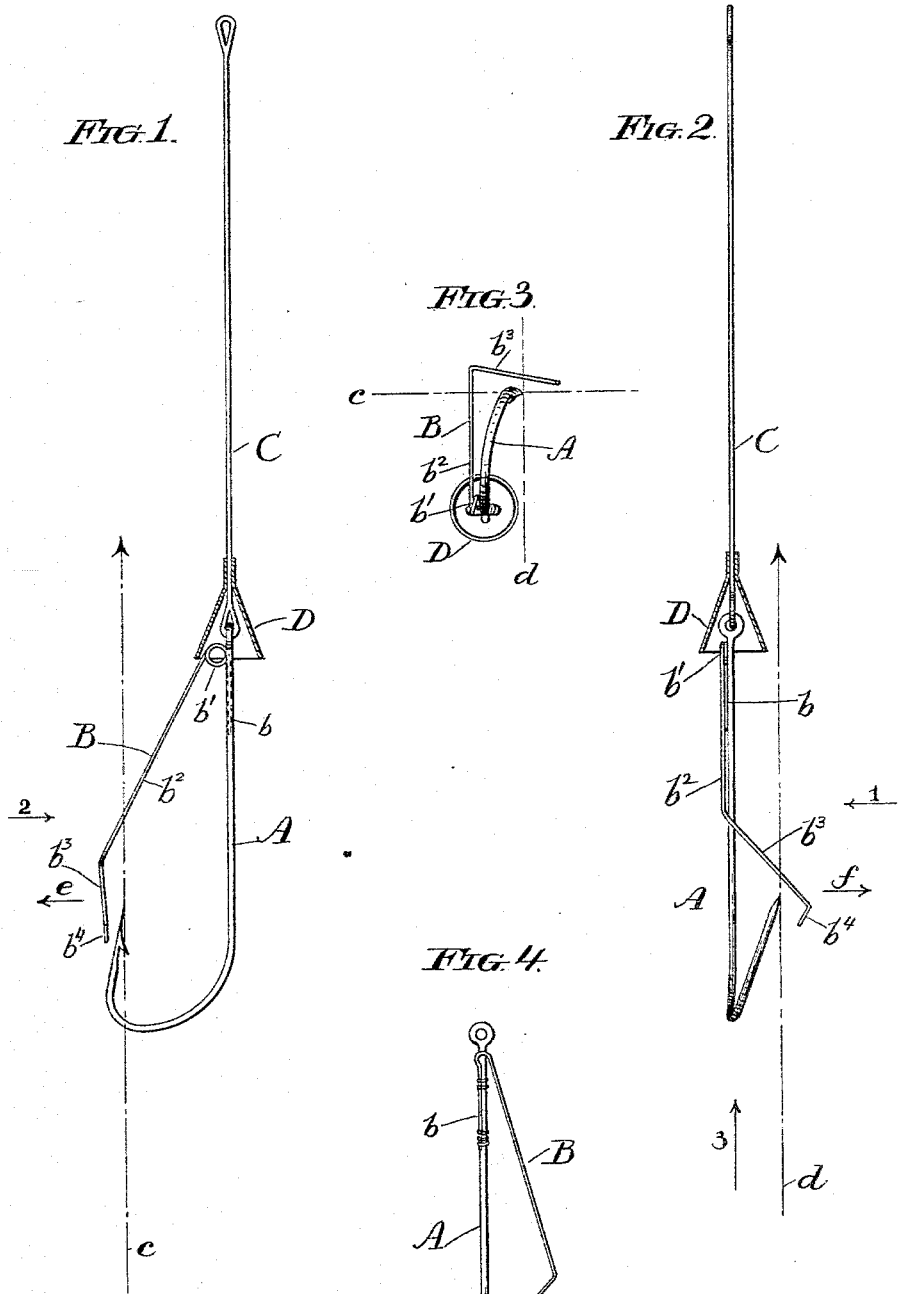

JAMES T. HASTINGS, OF CHICAGO, ILLINOIS, ASSIGNOR OF ONE-HALF TO CHARLES A. CRANE, OF SAME PLACE.

FISH-HOOK.

SPECIFICATION forming part of Letters Patent No. 533,590, dated February 5, 1895.

Application filed July 3, 1894. Serial No. 516,433. (No model.)

*To all whom it may concern:*

Be it known that I, JAMES T. HASTINGS, a citizen of the United States, residing at Chicago, in the county of Cook and State of Illinois, have invented certain new and useful Improvements in Fish-Hooks, of which the following is a specification.

The present invention relates to what are known as "weedless hooks" (being hooks provided with means for preventing them from catching and gathering weeds, grass and the like, while they are being drawn through the water) and particularly to that species of weedless hooks in which the guard does not rest normally in contact with the point of the hook. The only hook of this species of which I am aware is provided with a guard which is pivotally connected to the stem of the hook and which is held normally out of contact with the point by a delicate spring, the arrangement being such that when a weed comes in contact with the guard the force of the spring is overcome and the guard is closed against the point of the hook. This hook is complicated, easily got out of order and expensive and a more serious objection to it is that while the guard is closed the point of the hook is covered (the guard resting upon it) and it cannot take a fish.

The object of the present invention is to provide a hook of the species named which shall not be open to these objections and to this end the invention consists in the features of novelty that are particularly pointed out in the claims hereinafter and in order that it may be fully understood I will describe it with reference to the accompanying drawings which are made a part hereof and in which—

Figure 1 and 2 are elevations of a hook embodying the invention in its preferred form, viewed in the directions of the arrows 1 and 2, respectively. Fig. 3 is an elevation thereof viewed in the direction of the arrow 3. Fig. 4 is an elevation of a hook embodying one feature of the invention under a slight modification.

A represents the hook proper and B the guard the function of which is to ward off weeds and keep them from coming in contact with the point of the hook. Preferably this guard is made of a piece of spring wire having a portion $b$ secured to the stem of the hook (preferably soldered) a portion $b'$ which is coiled to increase the sensitiveness, a portion $b^2$ which proceeds toward the point of the hook, and a portion $b^3$ continuing from the portion $b^2$, but in a different direction and in a different plane. The portions $b^2$ and $b^3$ constitute the guard proper and in order that they may properly perform their function it is necessary that they occupy, with more or less exactness, certain positions with relation to the point of the hook. I will describe the positions of these parts precisely as they appear in the drawings but I desire to have it understood that a hook, in order to come within the scope of my invention, need not follow the construction shown and described with geometrical precision.

The lines $c$ and $d$ represent intersecting planes both of which may be supposed to cut the path traveled by the point of the hook as it is drawn through the water. The portion $b^2$ of the guard crosses the plane $c$ and lies in a plane which is parallel with the plane $d$ and the portion $b^3$ crosses the plane $d$ and lies in a plane which is nearly parallel with the plane $c$. The portion $b^2$ sheds the weeds in the direction of the arrow $e$ and the portion $b^3$ sheds them in the direction of the arrow $f$. The portions $b^2$ and $b^3$ are shown as being straight and with an angular bend between them, but, as before stated, geometrical accuracy is not essential and any hook having a guard which crosses planes related in substantially the same manner as are the planes $c$ and $d$, so that it will ward off the weeds substantially as above described is within the scope of my invention.

The guard is preferably constructed of spring wire and is of such strength that it will successfully resist the pressure of the weeds against the hook but will yield when the hook is taken by a fish. It does not however at any time come in contact with the point of the hook.

The guard shown in Figs. 1, 2 and 3 has a portion $b^4$ extending beyond the portion $b^3$, while the one shown in Fig. 4 has not.

In order to prevent weeds from catching at the point where the stem of the hook joins the snood, C, I secure to the snood a deflector D which is preferably hollow, of tapering shape, and projects outward beyond the joint and beyond the coil $b'$.

The guard shown in Fig. 4 is bound to the hook with a wire. It is without a coiled portion, and it is bent in a direction opposite that in which the guard shown in the other figures is bent; but these variations are all within the scope of the invention.

Having thus described my invention, the following is what I claim as new therein and desire to secure by Letters Patent:

1. The combination with a fish-hook, of a weed guard consisting of a spring secured to the stem of the hook, said spring extending toward the point of the hook and crossing in advance of the point the path to be traveled thereby, as the hook is drawn through the water, the guard being at all times out of contact with the point substantially as set forth.

2. The combination with a fish-hook, of a weed guard consisting of a spring secured to the stem of the hook said spring extending toward and beyond the point of the hook and crossing in advance of the point the path to be traveled thereby as the hook is drawn through the water, the guard being at all times out of contact with the point substantially as set forth.

3. The combination with a fish-hook of a weed guard consisting of a spring secured to the stem of the hook and extending toward the point thereof, said guard being in advance of the point and crossing two intersecting planes which cut the path to be traveled by the point of the hook as it is drawn through the water, the guard being at all times out of contact with the point substantially as set forth.

4. The combination with a fish-hook, of a weed guard consisting of a spring secured to the stem of the hook, said spring being in advance of the point and extending toward the point thereof and crossing the path to be traveled by said point as the hook is drawn through the water, said spring being at all times out of contact with the point, and having a coiled portion, substantially as set forth.

JAMES T. HASTINGS.

Witnesses:
L. M. HOPKINS,
J. HALPENNY.